Nov. 7, 1961 R. M. JACKMAN 3,007,833
METHOD OF LAMINATION
Filed Dec. 29, 1958
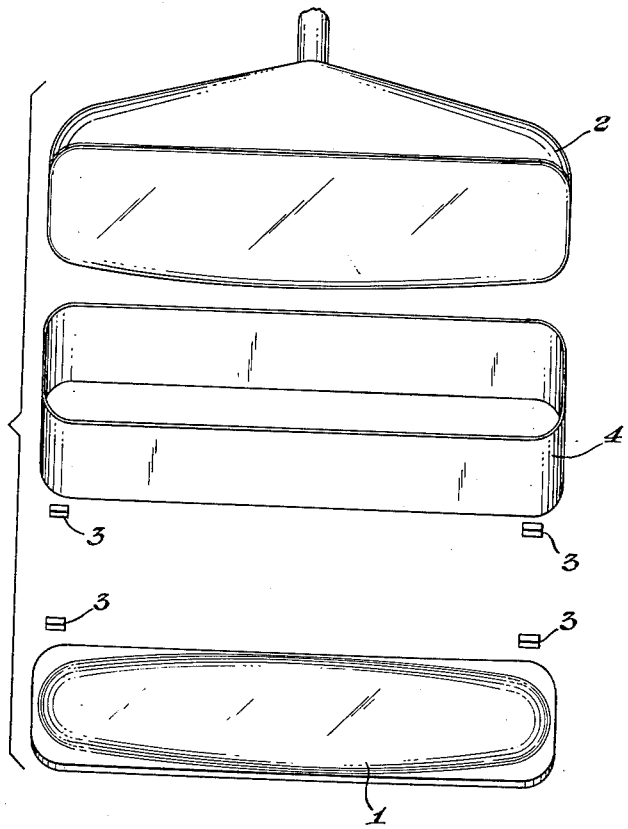
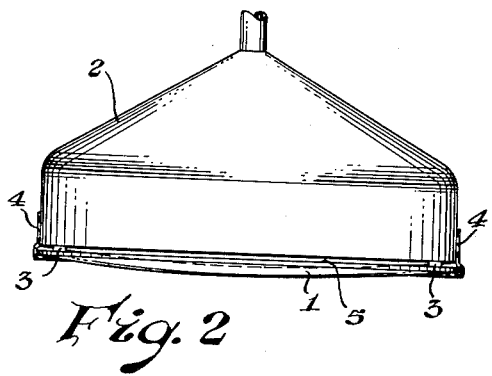
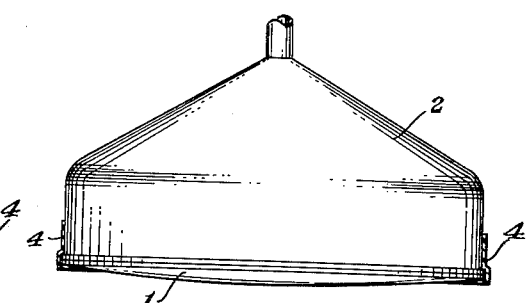
INVENTOR.
Robert M. Jackman
BY
ATTORNEY United States Patent Office 3,007,833
Patented Nov. 7, 1961

3,007,833
METHOD OF LAMINATION
Robert M. Jackman, Midland, Mich., assignor to The Dow Chemical Company, Midland, Mich., a corporation of Delaware
Filed Dec. 29, 1958, Ser. No. 783,384
3 Claims. (Cl. 156—85)

The present invention relates to a new and useful method for laminating safety implosion plates to cathode ray tubes and is more particularly directed to a method for laminating a safety plate to the face of a cathode ray tube.

It has now been found that when it is desirable to fixedly position and secure a safety plate to the viewing surface of a cathode ray tube to protect the tube and prevent splintering of the glass if the tube implodes, the plate and tube can be held in fixed relation prior to and during the curing of the laminating adhesive by peripherally encompassing the safety plate and the viewing end of the cathode ray tube with a shrinkable film and shrinking the film thus to form a substantially liquid-tight seal between the film and plate and film and cathode ray tube thereby to provide a cavity in which to receive a hardenable or curable transparent liquid adhesive which upon hardening or curing secures the plate to the viewing surface of the cathode ray tube.

To more clearly illustrate the present invention reference is had to the drawings:

FIGURE 1 illustrates an expanded view of the elements of the present invention;

FIGURE 2 illustrates in partial view the positioned safety plate and tube; and

FIGURE 3 illustrates in partial view the finished product.

With particular reference to the drawings the present invention comprises a method for securing an implosion safety plate 1 to the viewing surface of a cathode ray tube 2 by positioning the plate 1 in spaced apart relation to the viewing surface, this relationship being maintained by spacers 3, and peripherally encompassing the plate 1 and tube 2 with a shrinkable film 4. When so positioned the shrunken film 4 draws the plate 1 into rigid position against the spacers 3 and forms a liquid-tight seal between the film 4 and the tube 2 and plate 1. The cavity 5 produced by this positioning of the elements can then be filled with a hardenable liquid transparent adhesive, which when hardened, will positively position the tube and plate.

It is to be understood that substantially any shrinkable film and particularly the heat shrinkable films can be employed in accordance with the present invention to positively hold the elements in positive spaced-apart position. The term shrinkable films as employed herein means any of the bi-axially oriented films which upon heating relax to an unoriented condition and the films which when wet stretch and when dry shrink and the natural and synthetic rubbers which although not heat shrinkable are nevertheless equivalent under certain conditions to the heat shrinkable films. The relaxation of orientation causes the film to shrink. When bi-axially oriented the film upon relaxation shrinks both dimensions. One can employ the thermoplastic bi-axially oriented films such as polyethylene, crystalline Saran (copolymers of vinylidene chloride), polyesters such as Mylar, rubber chlorides (e.g. Pliofilm), which materials all are stretched during the production and which retain this stretched condition after production and are capable of shrinking upon relaxation by heating. Further one can employ effectively but to a somewhat lesser extent the non-crystalline oriented thermoplastic films including but not limited to the polyvinyl acetates, polyvinyl chlorides, polystyrenes, cellulose acetates, and other cellulose esters, ethyl cellulose and other thermoplastic cellulose ethers. Also it is to be understood that the celophane films (e.g., regenerated cellulose) can be employed if applied while fresh and water-wet and dehydrated to shrink them. These films can be pigmented as for example with aluminum or other opaque pigment. The natural and synthetic rubbers while not heat-shrinkable have been found to be useful particularly where the band is to be removed after hardening of the adhesive.

In practicing the invention, hereinbefore disclosed it is desirable to employ a film in the form of a tubular length of the shrinkable material having a length of from 2 to 6 inches. The band circumference should be substantially the circumference of the cathode ray tube. It is desirable that the band be of an oriented material or one of the rubbers which will shrink between 1 and 2 inches around the circumference and approximately the same ratio in the length.

The shrinking of the heat shrinkable bands can be accomplished by employing a blast of hot air directed against the band or by the application of radiant heat, such as, for example, placing the assembly in a heated oven or directing the heat of an infrared lamp against the film. The shrinking of the elastic bands is self-evident.

In another manner of practice of the present invention, a shrinkable material, either heat or elastic-type, can be wound around the periphery of the tube and plate and the end sewed so that upon shrinking the plate and tube will be drawn into position as hereinbefore described. Exemplary of the films which can be employed are the polyvinyl alcohol films having a thickness of between about 6 and about 18 mils, Saran films such as SW12 and Q4137.1 (all prepared by The Dow Chemical Company) having a thickness of from 1 to 4 or more mils. The thickness of the film is material only if the strength of the material requires more or less thickness to firmly hold the safety plate in position.

The following examples illustrate the present invention but is not to be construed as limited.

*Example 1*

A cathode ray tube (110°, 21 inch, standard television tube) was positioned above a ¼-inch-thick plate of glass which was of substantially the same dimensions as the viewing surface of the television tube and held in a spaced apart relationship by the use of four 1/16 inch thick spacers. Saran film (SW12) 2 mils thick in the form of a circular band having a circumference such as to provide a snug fit over the edge of the television tube adjacent the viewing surface of the tube was positioned around the tube in a manner such as to extend below the plate approximately 2 inches. The entire assembly was then placed in a heated oven and maintained therein until the film had shrunk. In the shrunken position the film supported the weight of the plate when the tube was lifted from the oven. Spouts were placed in opposite sides of the assembly extending between the glass tube and the Saran film to the cavity between the tube and plate and a heat-hardenable adhesive (the reaction product of 33 parts by weight of a diglycidyl ether of bisphenol A, 67 parts diglycidyl ether of polyoxypropylene glycol having a molecular weight of 400 and 5.5 parts of monoethanolamine and 1 part of diethylenetriamine) was introduced into the lower spout and introduction continued until the cavity was filled. The entrapped air escaped through the spout in the opposite side of the assembly. When the cavity was completely filled, the spouts were removed and the tube set aside while the resin was allowed to harden.

It is to be understood that other well-known means can be employed for introducing the adhesive into the cavity, as for example, needle injection and the like. Further it is to be understood that heating to shrink the film may be integrated with the preheating of the tube and plate to initiate more rapid cure or hardening of the adhesive.

While the present invention has been particularly directed to the employment of the heat shrinkable films, it is to be understood that the rubber, both synthetic and natural, or any other elastic material can be employed to position the assembly in the spaced apart relationship prior to applying the adhesive. Thus when one employs the rubbers or elastic materials it is only necessary to select a dimension of the band which when tensioned will hold the plate in juxta-position to the viewing face of the tube. Along this same line, as one employs the dehydratable cellophane-type band the dehydration can be accomplished by air-drying or by heating at an elevated temperature.

I claim:

1. In a method for securing a safety-plate to the viewing surface of a cathode ray tube the steps which comprise positioning the said plate in a spaced-apart relationship to the viewing surface; peripherally encompassing the plate and the tube face with a shrinkable film; and while maintaining said spaced apart relationship shrinking the film thus to form a substantially liquid-tight seal between the film and the tube and plate; filling the cavity thus formed with a heat hardenable liquid transparent adhesive; and hardening the adhesive.

2. A method for securing a safety implosion plate to the viewing surface of a cathode ray tube which comprises spacedly positioning the said plate apart from the face of said tube; and while maintaining said spaced apart relationship fixedly holding said plate and said tube in apposite relationship by shrinking a shrinkable plastic film circumferentially positioned about said tube and said plate thus sealing the space between the tube and the plate in liquid-tight relation; and, filling the void with a transparent, liquid, hardenable adhesive.

3. In the method for securing a safety shield to the viewing surface of a cathode ray tube wherein said shield is cemented to said viewing surface with a resinous adhesive having elasticity sufficient to prevent fragmentation of said shield and said tube face, the steps which comprise: aligning said shield with said viewing surface; spacing said shield in said aligned relationship apart from said viewing surface; encompassing edges of said shield and said tube face with a shrinkable film, and, while maintaining said spaced apart relationship, shrinking said film thereby to provide a liquid-tight seal about the void thus created between the two contiguous surfaces of the shield and viewing face; introducing a curable resinous adhesive into said void; and curing said resinous adhesive.

References Cited in the file of this patent

UNITED STATES PATENTS

| | | |
|---|---|---|
| 1,937,396 | Watkins | Nov. 28, 1933 |
| 2,011,452 | Lutz | Aug. 13, 1935 |
| 2,020,178 | Haas | Nov. 5, 1935 |
| 2,058,703 | Malivert | Oct. 27, 1936 |
| 2,084,113 | Sherts | June 15, 1937 |
| 2,293,529 | Bedford | Aug. 18, 1942 |
| 2,303,125 | Knight | Nov. 24, 1942 |
| 2,403,734 | Malm et al. | July 9, 1946 |
| 2,565,316 | Lucas et al. | Aug. 21, 1951 |
| 2,577,466 | Jones | Dec. 4, 1951 |
| 2,733,789 | Tolle | Feb. 7, 1956 |
| 2,756,892 | Bleuze et al. | July 31, 1956 |
| 2,785,820 | Vincent et al. | Mar. 19, 1957 |
| 2,827,584 | Olson | Mar. 18, 1958 |